(12) United States Patent
Huang

(10) Patent No.: US 7,807,589 B2
(45) Date of Patent: Oct. 5, 2010

(54) METHOD FOR MANUFACTURING POLYACRYLONITRILE FIBER CLOTH AND FIREPROOF CLOTH MADE OF SUCH CLOTH

(75) Inventor: Chien-Hsun Huang, Sinshih Township, Tainan County (TW)

(73) Assignee: Chian Yu Technologies Company Ltd., Tainan County (TW)

( * ) Notice: Subject to any disclaimer, the term of this patent is extended or adjusted under 35 U.S.C. 154(b) by 904 days.

(21) Appl. No.: 11/585,943

(22) Filed: Oct. 25, 2006

(65) Prior Publication Data

US 2010/0086763 A1     Apr. 8, 2010

(51) Int. Cl.
*B32B 27/12*     (2006.01)
(52) U.S. Cl. .................. 442/136; 428/920; 428/921
(58) Field of Classification Search .............. 442/136; 428/920, 921
See application file for complete search history.

(56) References Cited

U.S. PATENT DOCUMENTS 4,623,571 A * 11/1986 Yamamoto et al. ............ 428/68

* cited by examiner

*Primary Examiner*—Ula C Ruddock
(74) *Attorney, Agent, or Firm*—Rosenberg, Klein & Lee

(57) ABSTRACT

A kind of fireproof cloth includes a piece of polyacrylonitrile fiber cloth; to make the polyacrylonitrile fiber cloth, first polymer of polyacrylonitrile is spun into fiber, and flame-resisting treatment is carried out on the polyacrylonitrile fiber in air, and next the polyacrylonitrile fiber is woven into polyacrylonitrile fiber cloth; because of the flame-resisting treatment, the polyacrylonitrile fiber has high strength, high elasticity and heat isolation capability, and is highly resistible to instantaneous high temperature; the polyacrylonitrile fiber cloth has excellent water absorbing capability therefore structure of the fireproof cloth won't be damaged when the fireproof cloth is washed with water.

15 Claims, 4 Drawing Sheets

```
┌─────────────────────────────────────────────────────────────┐
│  weaving the polyacrylonitrile fiber into polyacrylonitrile fiber │
│                           cloth                              │
└─────────────────────────────────────────────────────────────┘
                               │
                               ▼
┌─────────────────────────────────────────────────────────────┐
│ positioning a piece of thermoplastic cotton cloth on a lower side │
│              of the polyacrylonitrile fiber cloth            │
└─────────────────────────────────────────────────────────────┘
                               │
                               ▼
┌─────────────────────────────────────────────────────────────┐
│  positioning a piece of thin metallic layer on an upper side of the │
│                   polyacrylonitrile fiber cloth              │
└─────────────────────────────────────────────────────────────┘
                               │
                               ▼
┌─────────────────────────────────────────────────────────────┐
│ positioning a piece of thermoplastic cotton cloth on a lower side │
│              of the polyacrylonitrile fiber cloth            │
└─────────────────────────────────────────────────────────────┘
                               │
                               ▼
┌─────────────────────────────────────────────────────────────┐
│  positioning a piece of thin metallic layer on an upper side of the │
│                   polyacrylonitrile fiber cloth              │
└─────────────────────────────────────────────────────────────┘
                               │
                               ▼
┌─────────────────────────────────────────────────────────────┐
│  positioning a piece of oxidized fiber cloth and a piece of Kevlar │
│           on a lower side of the thermoplastic cotton cloth  │
└─────────────────────────────────────────────────────────────┘
                               │
                               ▼
┌─────────────────────────────────────────────────────────────┐
│ positioning a piece of heat-resisting cloth under the oxidized fiber cloth │
│                         and the Kevlar                       │
└─────────────────────────────────────────────────────────────┘
```

FIG. 1

METHOD FOR MANUFACTURING POLYACRYLONITRILE FIBER CLOTH AND FIREPROOF CLOTH MADE OF SUCH CLOTH

BACKGROUND OF THE INVENTION

1. Field of the Invention

The present invention relates to a method for manufacturing polyacrylonitrile fiber cloth to be used as a material for fireproof cloth, more particularly one for manufacturing a kind of polyacrylonitrile fiber cloth that has excellent water absorbing capability, and whose structure won't be damaged when the polyacrylonitrile fiber cloth is washed with water.

2. Brief Description of the Prior Art

A report revealed that the number of fire incidents was 5139, and the number of fatalities from fires in 2005 rose to 139 in Taiwan, and more than half of the fire accidents were assessed as "potentially avoidable". Statistics show that about one half of fire incidents were caused by textiles. Therefore, it is stipulated that fireproof cloth be used as the materials for curtains, table covers etc in public places. Fireproof cloth materials will stop burning as soon as fire source leaves them therefore they can retard fire, won't melt into liquid form or produce toxic gas, having many advantages.

Fireproof cloth materials can be roughly grouped into fireproof polyester gauze, and fireproof acrylic gauze, which both contain chemicals capable of retarding fire. Such gauze can be made of yarn that has been previously soaked in fire retarding chemicals; such fireproof gauze will retain its fireproof capability after it is washed with water. Or alternatively, gauze can be soaked in fire retarding chemicals after weaving; fireproof capability of such fireproof gauze will reduce or even disappear after the gauze is washed with water.

Referring to FIG. 4, such fireproof cloth comprises an outer layer 6, and an inner layer 7. The outer layer 6 includes a metallic layer 61, and a textile layer 62, which is made of oxidized fiber, positioned under and joined to the metallic layer 61; thus, the outer layer 6 is fireproof and waterproof, and can reflect radiating heat. The inner layer 7 includes a waterproof plastic layer 71, and a textile layer 62 made of oxidized fiber.

Such fireproof cloth has the following disadvantages:

1. The textile layers made of oxidized fiber don't have water absorbing capability therefore structure and fireproof capability of the fireproof cloth will be damaged after the fireproof cloth is washed with water.

2. The metallic layers of the fireproof cloth are irresistible to bending, and prone to crack when they are used. Consequently, the fireproof cloth has relatively short service life.

3. The metallic layers are prone to crack to lose its heat-isolation function when the fireproof cloth is subjected to a great external force such as shock caused by explosion in fire. Consequently, the users will be in danger of getting injured and even killed in fire.

SUMMARY OF THE INVENTION

It is a main object of the invention to provide an improvement on a fireproof cloth to overcome the above-mentioned problems.

The fireproof cloth of the present invention includes a piece of polyacrylonitrile fiber cloth, a piece of thermoplastic cotton cloth, a piece of oxidized fiber cloth, a piece of Kevlar as well as a piece of heat-resisting cloth under the polyacrylonitrile fiber cloth, and a thin metallic layer formed on an upper side of the polyacrylonitrile fiber cloth. The thin metallic layer is formed by means of rolling a roller with slightly melted aluminum over the polyacrylonitrile fiber cloth; thus, the polyacrylonitrile fiber cloth will be only partly covered with the thin metallic layer, and the polyacrylonitrile fiber cloth won't become less resistible to bending or more easily breakable owing to the metallic layer. To manufacture the polyacrylonitrile fiber cloth, first, polymer of polyacrylonitrile is spun into fiber, and flame-resisting treatment is carried out on the polyacrylonitrile fiber in air, in which flame-resisting treatment the polyacrylonitrile fiber is heated at 200° C. to 300° C. for 10 to 20 hours. Next, the polyacrylonitrile fiber is woven into polyacrylonitrile fiber cloth. Because of the flame-resisting treatment, the polyacrylonitrile fiber has high strength, high elasticity and heat isolation capability, and is highly resistible to instantaneous high temperature, and the polyacrylonitrile fiber cloth has excellent water absorbing capability. Consequently, structure of the fireproof cloth won't be damaged even if the fireproof cloth is washed with water.

BRIEF DESCRIPTION OF THE DRAWINGS

The present invention will be better understood by referring to the accompanying drawings, wherein:

FIG. 1 is a flow chart of the present invention,

DETAILED DESCRIPTION OF THE PREFERRED EMBODIMENTS

Referring to FIG. 1, a preferred embodiment of a method for manufacturing polyacrylonitrile fiber cloth includes the following steps:

(a) spinning polymer of polyacrylonitrile into fiber;

(b) carrying out flame-resisting treatment on polyacrylonitrile fiber in air, in which flame-resisting treatment the polyacrylonitrile fiber is heated at 200° C. to 300° C. for 10 to 20 hours;

(c) weaving the polyacrylonitrile fiber into polyacrylonitrile fiber cloth;

(d) positioning a piece of thermoplastic cotton cloth on a lower side of the polyacrylonitrile fiber cloth;

(e) positioning a piece of thin metallic layer on an upper side of the polyacrylonitrile fiber cloth;

(f) positioning a piece of oxidized fiber cloth and a piece of Kevlar on a lower side of the thermoplastic cotton cloth; and (g) positioning a piece of heat-resisting cloth under the oxidized fiber cloth and the Kevlar.

Figure 2:
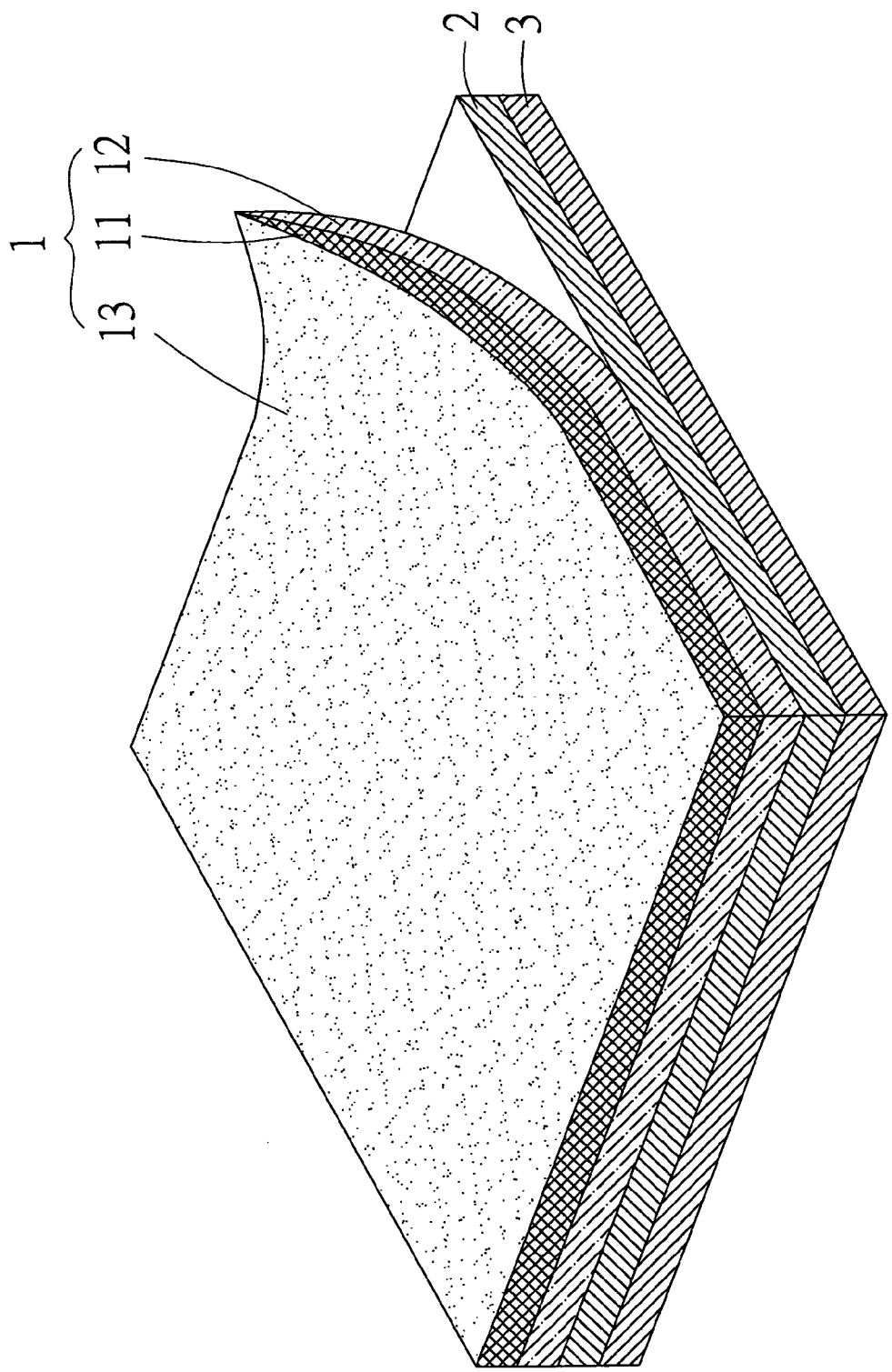
FIG. 2 is a perspective view of the fireproof cloth made according to the method in the present invention.
Figure 3:
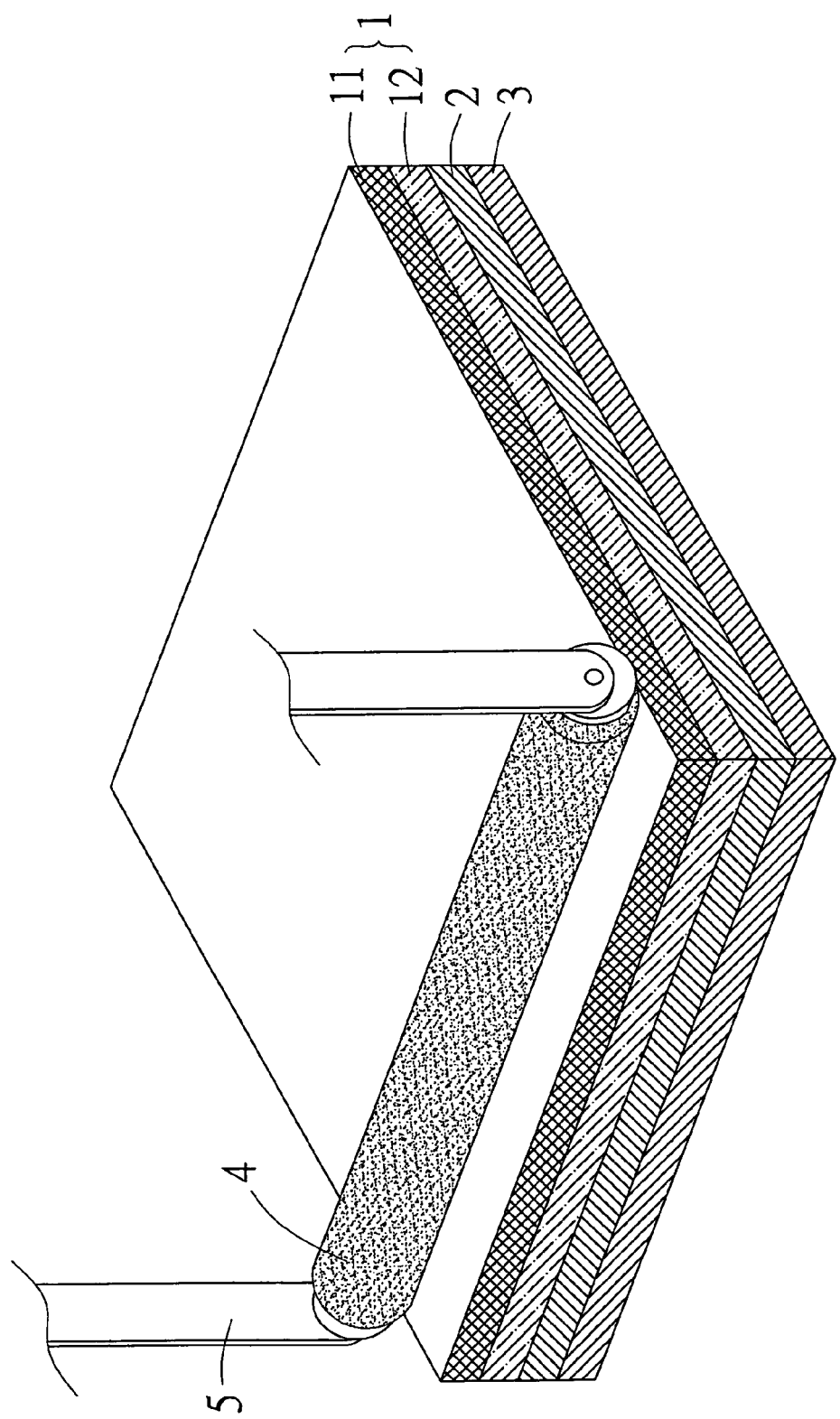
FIG. 3 is a view of a roller being rolled over in manufacturing.
Figure 4:
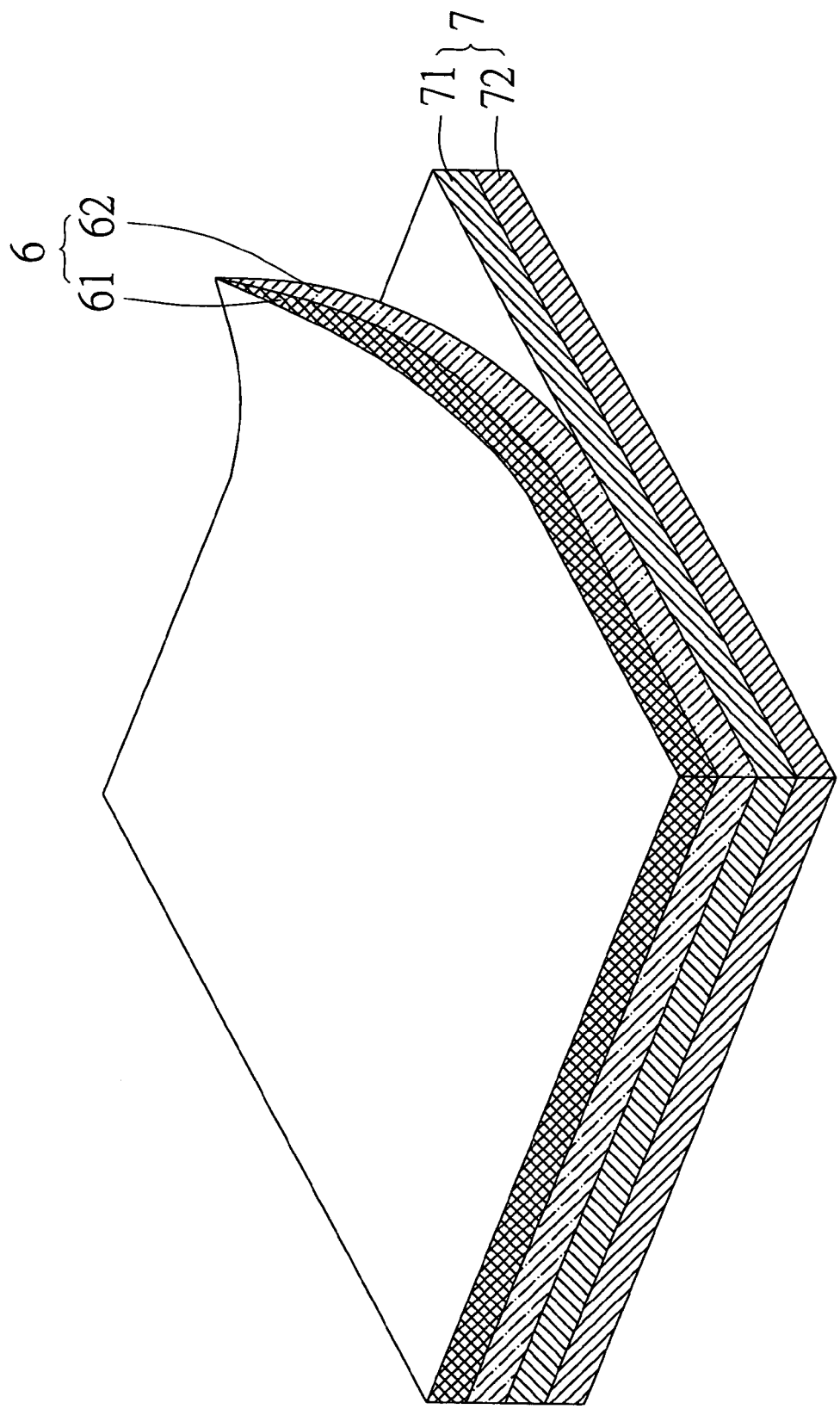
FIG. 4 is a perspective view of the conventional fireproof cloth.

Referring to FIGS. 2 and 3, a preferred embodiment of a fireproof cloth made of polyacrylonitrile fiber cloth includes a first fireproof layer 1, a second fireproof layer 2, and a third fireproof layer 3.

The first fireproof layer 1 consists of a piece of polyacrylonitrile fiber cloth 11, a piece of thermoplastic cotton cloth 12 under the polyacrylonitrile fiber cloth, and a thin metallic layer 13 on the polyacrylonitrile fiber cloth 11. Because the polyacrylonitrile fiber cloth 11 is made of polyacrylonitrile fiber having been subjected to flame-resisting treatment, it will only be carbonized when it is in a near-burned state. Furthermore, the polyacrylonitrile fiber cloth 11 won't burn, melt or shrink even if it is in a near-burned state. Therefore, the polyacrylonitrile fiber cloth 11 has high strength, high elasticity and heat isolation capability, and is highly resistible to instantaneous high temperature, having many advantages. In addition, molecules of the polyacrylonitrile fiber cloth 11 contain a lot of hydrophilic structures, and in turn the fiber has excellent water absorbing capability, good resistibility to solvents, and relatively low sensitivity to humidity. Thus structure of the fireproof cloth won't be damaged when the fireproof cloth is washed with water. And, shape of the polyacrylonitrile fiber cloth 11 will be fixed without causing loss of elasticity of the polyacrylonitrile fiber cloth 11 after the polyacrylonitrile fiber cloth 11 is positioned over and joined to the thermoplastic cotton cloth 12. Aluminum is used as the material for the thin metallic layer 4, and the thin metallic layer 4 is applied on the polyacrylonitrile fiber cloth 11 with the help of a roller 5; more detailedly speaking, aluminum is slightly melted on the roller 5, and next the roller 5 is rolled over the polyacrylonitrile fiber cloth 11. Because the aluminum is slightly melted, the polyacrylonitrile fiber cloth 11 will be only partly covered with the aluminum, i.e. the thin metallic layer 4, after the roller 5 is rolled over the polyacrylonitrile fiber cloth 11. Consequently, the polyacrylonitrile fiber cloth 11 retains its extensibility as well as stretching and compressing capability, and the thin metallic layer 4 won't make the polyacrylonitrile fiber cloth 11 less resistible to bending or more easily breakable.

The second fireproof layer 2 can be made of oxidized fiber cloth, Kevlar or both oxidized fiber cloth and Kevlar, and is positioned on and joined to a lower side of the first fireproof layer 1 to support the whole structure. The oxidized fiber cloth and the Kevlar can comprise different layers of the second fireproof layer 2, one over the other. Or alternatively, materials of oxidized fiber cloth and Kevlar can be mixed together, and next spun and woven into cloth. Oxidized fiber cloth has a soft texture, and is difficult to burn, non-splitable and non-decomposable, and it has a melting point of 900 to 1000° C. And, Kevlar can be used in high temperature environment and low temperature one, and has a wide variety of applications, and is highly elastic, highly resistible to heat, highly resistible to acid, and relatively difficult to sever and difficult to burn.

The third fireproof layer 3 comprises burning-bearable cloth, and positioned on and joined to a lower side of the second fireproof layer 2; the burning-bearable cloth preferably comprises polyethylene non-woven fabrics to have good touch and provide comfort to people besides being burning-bearable and heat-isolating.

To put the fireproof cloth of the present invention into application, the fireproof cloth can be made into firefighter suits, firefighting blankets, industrial welding pads, and heat-resistible blankets. Because of the burning-bearable, fireproof and heat isolation properties of the fireproof cloth, the firefighter suits, the firefighting blankets, the industrial welding pads, and the heat-resistible blankets will help reduce the chance of fire at homes, public places, and factories. Furthermore, because of the thin metallic layer, the fireproof cloth can reflect radiation besides being fireproof and waterproof. And, the fireproof cloth can be used to help people escape in case of fire, thus reducing casualty.

From the above description, it can be seen that the fireproof cloth of the present invention has the following advantages over the prior art:

1. The polyacrylonitrile fiber cloth is made of polyacrylonitrile fiber, which has been previously subjected to flame-resisting treatment, therefore it has high strength, high elasticity and heat isolation capability, and is highly resistible to instantaneous high temperature, having many advantages.

2. The polyacrylonitrile fiber cloth contains a lot of hydrophilic structures, and in turn the fiber has excellent water absorbing capability, good resistibility to solvent, and relatively low sensitivity to humidity. Thus, structure of the fireproof cloth won't be damaged when the fireproof cloth is washed with water.

3. The fireproof cloth includes the thin metallic layer therefore it can reflect radiation besides being fireproof and waterproof.

4. The polyacrylonitrile fiber cloth is only partly covered with the thin metallic layer therefore it retains its extensibility as well as stretching and compressing capability, and the thin metallic layer won't make the polyacrylonitrile fiber cloth less resistible to bending or more easily breakable.

5. The polyacrylonitrile fiber cloth is only partly covered with the thin metallic layer therefore the thin metallic layer can't cause the polyacrylonitrile fiber cloth to lose its extensibility and stretching and compressing capability. The thin metallic layer won't crack to lose its heat-isolation function even if the fireproof cloth is subjected to a great external force such as shock caused by explosion in fire.

What is claimed is:

1. A fireproof cloth made of polyacrylonitrile fiber cloth, comprising:
    a first fireproof layer including polyacrylonitrile fiber cloth,
    a second fireproof layer including an oxidized fiber cloth material having a melting point of at least 900° C., and positioned on a lower side of said first fireproof layer; and
    a third fireproof layer including a flame resistant cloth and positioned on a lower side of said second fireproof layer;
    wherein a piece of material containing thermoplastic and cotton is positioned on a lower side of said polyacrylonitrile fiber cloth.

2. The fireproof cloth made of polyacrylonitrile fiber cloth as recited in claim 1, wherein a thin metallic layer is formed on an upper side of said polyacrylonitrile fiber cloth.

3. The fireproof cloth made of polyacrylonitrile fiber cloth as recited in claim 2, wherein aluminum is used as a material for said thin metallic layer.

4. The fireproof cloth made of polyacrylonitrile fiber cloth as recited in claim 2, wherein a roller is used to apply said thin metallic layer on said polyacrylonitrile fiber cloth, and said polyacrylonitrile fiber cloth is partly covered with said thin metallic layer.

5. The fireproof cloth made of polyacrylonitrile fiber cloth as recited in claim 1, wherein the flame resistant cloth includes a polyethylene non-woven fabric.

6. A fireproof cloth made of polyacrylonitrile fiber cloth, comprising:
    a first fireproof layer including polyacrylonitrile fiber cloth,
    a second fireproof layer including an aramid fiber material, and positioned on a lower side of said first fireproof layer; and
    a third fireproof layer including a flame resistant cloth and positioned on a lower side of said second fireproof layer;
    wherein a piece of material containing thermoplastic and cotton is positioned on a lower side of said polyacrylonitrile fiber cloth.

7. The fireproof cloth made of polyacrylonitrile fiber cloth as recited in claim 6, wherein a thin metallic layer is formed on an upper side of said polyacrylonitrile fiber cloth.

8. The fireproof cloth made of polyacrylonitrile fiber cloth as recited in claim 7, wherein aluminum is used as a material for said thin metallic layer.

9. The fireproof cloth made of polyacrylonitrile fiber cloth as recited in claim 7, wherein a roller is used to apply said thin metallic layer on said polyacrylonitrile fiber cloth, and said polyacrylonitrile fiber cloth is partly covered with said thin metallic layer.

10. The fireproof cloth made of polyacrylonitrile fiber cloth as recited in claim 6, wherein the flame resistant cloth includes a polyethylene non-woven fabric.

11. A fireproof cloth made of polyacrylonitrile fiber cloth, comprising:

a first fireproof layer including polyacrylonitrile fiber cloth, a second fireproof layer positioned on a lower side of said first fireproof layer, said second fireproof layer including an oxidized fiber cloth material having a melting point of at least 900° C. and an aramid fiber material; and a third fireproof layer including a flame resistant cloth and positioned on a lower side of said second fireproof layer;

wherein a piece of material containing thermoplastic and cotton is positioned on a lower side of said polyacrylonitrile fiber cloth.

12. The fireproof cloth made of polyacrylonitrile fiber cloth as recited in claim 11, wherein a thin metallic layer is formed on an upper side of said polyacrylonitrile fiber cloth.

13. The fireproof cloth made of polyacrylonitrile fiber cloth as recited in claim 12, wherein aluminum is used as a material for said thin metallic layer.

14. The fireproof cloth made of polyacrylonitrile fiber cloth as recited in claim 12, wherein a roller is used to apply said thin metallic layer on said polyacrylonitrile fiber cloth, and said polyacrylonitrile fiber cloth is partly covered with said thin metallic layer.

15. The fireproof cloth made of polyacrylonitrile fiber cloth as recited in claim 11, wherein the flame resistant cloth includes a polyethylene non-woven fabric.

\* \* \* \* \*